United States Patent [19]
Doctor

[11] Patent Number: 5,455,424
[45] Date of Patent: Oct. 3, 1995

[54] EARTH SENSOR FOR SATELLITES

[75] Inventor: Alan P. Doctor, Sea Cliff, N.Y.

[73] Assignee: Servo Corporation of America, Hicksville, N.Y.

[21] Appl. No.: 227,270

[22] Filed: Apr. 13, 1994

[51] Int. Cl.$^6$ ...................................................... G01J 5/06
[52] U.S. Cl. .......................... 250/349; 250/342; 244/171
[58] Field of Search ............................... 250/349, 347, 250/338.1, 342, 372; 244/171

[56] References Cited

U.S. PATENT DOCUMENTS 3,304,425  2/1967  Astheimer ................................ 250/349
4,048,500  9/1977  Moore ..................................... 250/349
5,055,689  10/1991  Proffit et al. ............................ 250/349

Primary Examiner—Carolyn E. Fields
Attorney, Agent, or Firm—Kane, Dalsimer, Sullivan, Kurucz, Levy, Eisele and Richard

[57] ABSTRACT

The attitude of a satellite is determined by using an array of IR detectors receiving an image of space and the Earth. The detectors are spaced so that at least in a central zone, the sun will not enter the optical field of more than one detector. The signals from each detector are monitored and if a signal is very high, indicating that the sun's image is falling on the detector, that signal is ignored.

14 Claims, 2 Drawing Sheets

EARTH SENSOR FOR SATELLITES

BACKGROUND OF THE INVENTION a. Field of Invention

This invention pertains to a sensor for the detecting the Earth from a satellite, and more particularly to a system for detecting the horizon of the Earth to determine the satellite's attitude.

b. Description of the Prior Art

As a satellite is orbiting the Earth, its attitude must be checked periodically to determine the pitch and roll of the satellite. This task is normally accomplished using Earth sensor systems having IR detectors which monitor the surface of the Earth and determine the position of its horizon by comparing the radiant contrast between the Earth and space. However present systems are very susceptible to errors when the sun, as viewed from the satellite, is near the Earth's horizon because in the optical field of the detectors, it presents a very strong IR source.

OBJECTIVES AND SUMMARY OF THE INVENTION

It is an objective of the present invention to provide an improved sensor system which is capable of proper operation even if the sun is in the optical field of its detectors.

A further objective is to provide a sensor system with detectors positioned to provide redundancy so that if one detector is incapacitated by strong radiation from the sun, the detector can be disregarded without substantially affecting the operation of the system.

Briefly, an Earth sensor system constructed in accordance with this invention includes a plurality of detectors arranged in a two dimensional array and positioned to receive an image of the Earth's horizon as a reference element. The detectors generate signals which are analyzed to determine the relative position of the image reference on the array from which the satellite attitude can be determined and corrected. At least two of the detectors are spaced at a distance greater than the image of the sun. Preferably these two detectors are positioned at the most critical zone, i.e. the nominal position of the horizon where the sensor system is most sensitive. If one of the detectors is disabled by the sun, the other can take its place without substantially affecting the performance of the detector array.

DETAILED DESCRIPTION OF THE INVENTION

Figure 1:
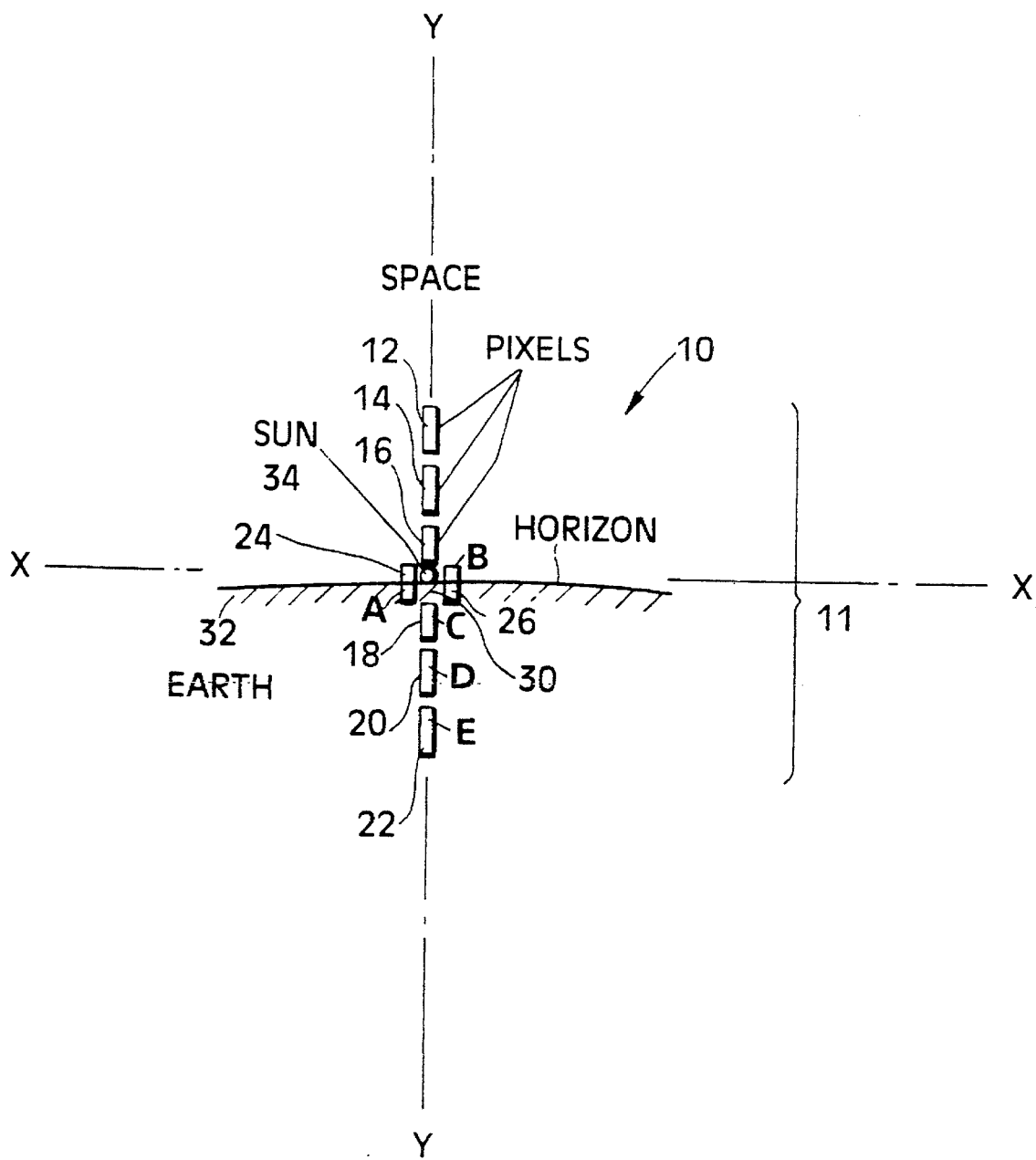
FIG. 1 shows a somewhat schematic image of the Earth's horizon and the sun as perceived by an array of IR detectors.

Referring now to FIG. 1, the subject Earth sensor system 10 includes a plurality of IR detectors arranged in a two dimensional array 11. While other arrangements may be used, in FIG. 1 the detector array 11 includes two groups of detectors. The first group of six detectors 12–22 is arranged substantially along a vertical axis Y—Y while the second group of two detectors 24, 26 are arranged along a horizontal axis X—X. Detectors 16 and 18 disposed immediately above and below axis X—X respectively are spaced further apart than the other detectors of the first group to accommodate the sensors 24, 26 of the second group. The two detectors of the second group 24, 26 are spaced apart by a distance substantially equal to the spacing between the detectors 16, 18 to form a substantially square zone 30 therebetween and selected so that it is larger than the apparent diameter of the sun.

When the satellite is in a normal or preselected attitude, the image of the Earth projected on the array 11 falls such that the Earth's horizon 32 is substantially tangential to the X—X axis. Under these conditions detectors 18, 20, 22 generate signals indicative of the temperature of the Earth, detectors 12, 14, and 16 generate signals indicative of the temperature of deep space and detectors 24 and 26 generate signals indicative of an intermediate temperature. As mentioned above, erroneous results occurred in prior art systems when the image of the sun was also projected on the detectors near the horizon 32. In the present invention, when the satellite is in the ideal position shown in FIG. 1, the four detectors 16, 18, 24, 26 are positioned so that the sun's image 34 does not fall on any of these detectors but on square zone 30 and hence does not affect the signals generated by these detectors. If the sun's image 34 does fall on any of the detectors, the signal from the affected detector is ignored as described below.

Figure 2:
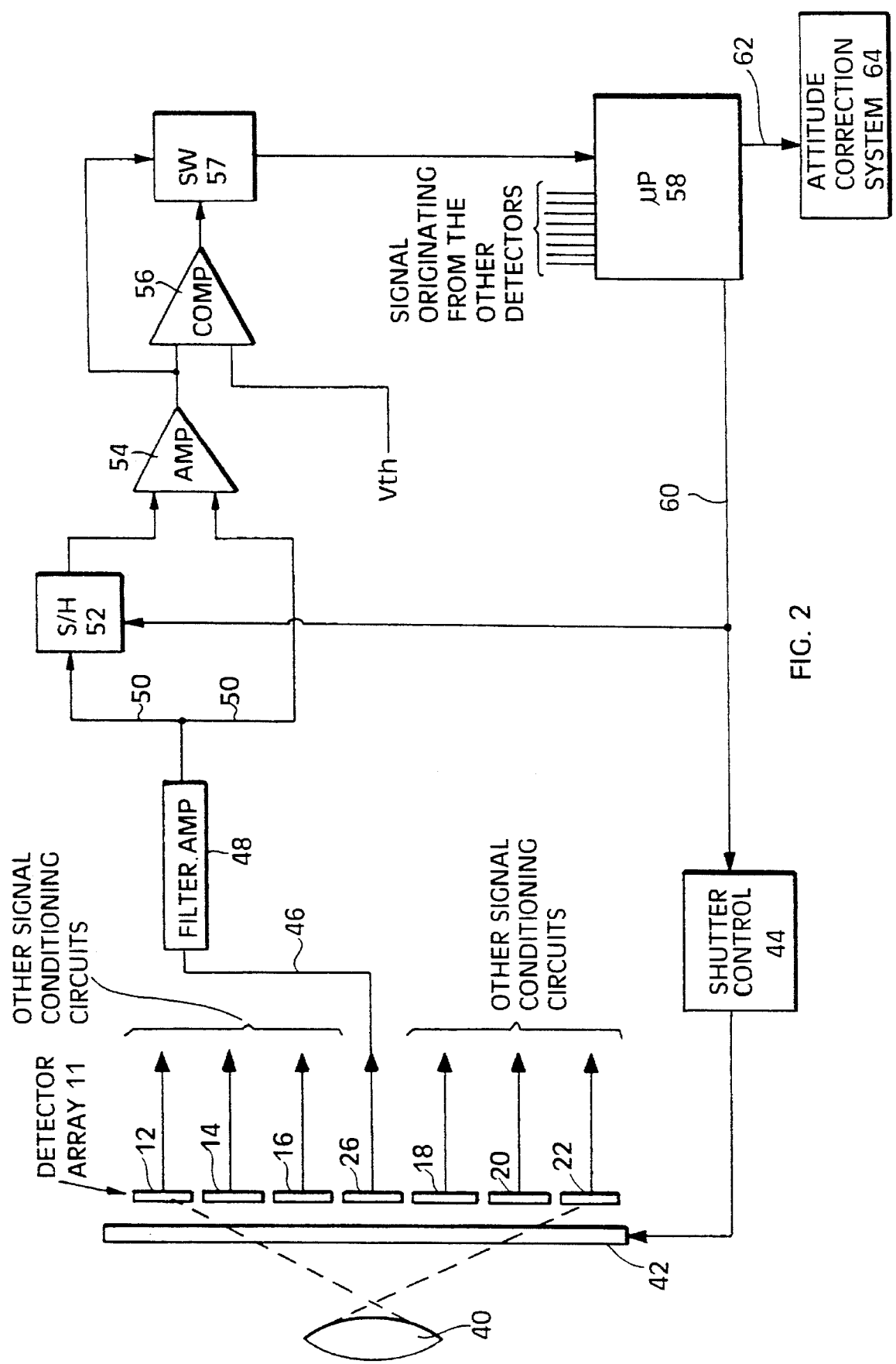
FIG. 2 shows a block diagram of the sensor system incorporating the detectors of FIG. 1 and constructed in accordance with this invention.

The elements of the signal processing circuitry for the detectors are shown in FIG. 2. As seen in this Figure, the array of detectors 11 and the lens 40 are positioned so that an image of the Earth and its horizon is projected by lens 40 on the array as discussed above. A shutter 42 is positioned either in front of the lens 40, or as shown in FIG. 2 between the lens 40 and array 11. The shutter 42 is controlled by a shutter control circuit 44 to selectively block the image of the Earth and space from the array 11.

Detector 26 detects the incident IR radiation and generates a corresponding electrical signal on line 46. This signal is conditioned by a signal conditioning circuit 48, which may include filtering and amplification means. The conditioned signal is fed on lines 50 to a sample-and-hold circuit 52 and a differential amplifier 54. Amplifier 54 also receives an input from the sample-and-hold circuit 52. The output of amplifier 54 is fed to a comparator 56 which also receives a threshold value Vth as an input. The output of amplifier 54 is also fed to a microprocessor 58 through an electronic switch 57 controlled by comparator 56. The microprocessor 58 receives similar signals from other signal processing circuits substantially identical to the one just described, said signals originating from the other detectors of the array 11. In response microprocessor 58 generates control signals on line 60 to the shutter control 44 and sample-and-hold circuit 52, and on line 62, to attitude correction system 64. It should be understood that all or most of the circuitry shown in FIG. 2 may be incorporated into the microprocessor 58 and is shown as having discrete components for the sake of clarity.

The sensor system operates as follows, assuming first that the sun is not in the optical field of the detector array 11. Initially the shutter is in place in front of the detector array 11. Each detector of the array 11 generates a signal indicative of the temperature of the shutter 42. The signal from detector 26, after conditioning, is stored in the sample and hold circuit 52 as a reference signal at the direction of the microprocessor 58. The shutter is removed by the shutter control circuit 44 and an image of the Earth's horizon is projected on array 11 by lens 40. In response, detector 26 generates a signal which is fed to amplifier 54. The difference between the detected and the reference signals is provided to the microprocessor 58 through the switch 57. A detected signal higher than the reference signal stored in the sample-and-hold circuit 52 indicates that the corresponding receives an image of the Earth or its horizon. A lower signal indicates that the corresponding detector is receiving an image of space. The microprocessor 58 analyses the signals from each of the detectors array 11, determines from them the relative location of the horizon and activates the attitude correction system 64 to change the attitude of the satellite until the image shown in FIG. 1 is sensed by the detector array 11. The signals from detectors 24, 26 may be averaged by the microprocessor to provide redundancy and increase the accuracy of the system in the region of the expected position of the horizon.

If the position of the sun is such that its image enters the optical field of one of the detectors 24 or 26, the output of that detector exceeds by far the reference signal and it is a signal of opposite polarity from the corresponding sample-and-hold circuit. The difference between these two signals as well as the polarity difference is monitored by comparator 56 and if this difference exceeds the value Vth, it is assumed that the sun is in the optical field of detector 26 and the output of comparator 56 is ignored by the microprocessor 58. Instead the microprocessor makes use of the signal from the other detector 24 to determine the location of the horizon. Therefore even if the sun is in the field of sensors 24 or 26, its effect is negated. If the sun enters the optical field of one of the other sensors 12–22 its output is similarly ignored.

Obviously numerous modifications may be made to this invention without departing from its scope as defined in the appended claims.

I claim:

1. A sensor system for determining the attitude of a satellite comprising:

an array of detectors, each detector generating a signal indicative of incident radiation;

projecting means for projecting an image on said array, said image including a reference element and a sun image;

signal processing means for processing said signals to determine the location of said reference element with respect to said detectors;

wherein two of said detectors are adjacent, in the same field of view and are spaced at a distance larger than a diameter of said sun image; and means for comparing said signals to a threshold level to determine if said sun image is superimposed on one of said detectors, said signal processing means ignoring a signal from a detector on which said sun image is superimposed.

2. The system of claim 1 wherein said array is two-dimensional.

3. The system of claim 1 wherein said reference element is the Earth's horizon.

4. The system of claim 1 further comprising shutter means for selectively blocking said projecting means, said detectors generating blocked signals when said projecting means is blocked and unblocked signals when said projecting means is unblocked by said shutter means.

5. The system of claim 4 further comprising signal storage means for storing signals when said detectors are blocked to establish reference signals.

6. The system of claim 5 further comprising amplifier means for amplifying a difference of said blocked and unblocked signals.

7. An Earth sensor system to determine the attitude of a satellite from the Earth's horizon, said system comprising:

a two dimensional array of detectors arranged to receive an image of the Earth's horizon and an image of the sun, said detectors generating signals indicative of the incident radiation, said array including at least two detectors spaced at a distance selected to exceed said image of said sun, said detectors including a first group arranged along a first axis and a second group arranged along a second axis orthogonal to said first axis, said axes intersecting at a point and said two detectors being disposed on opposite sides of said point; and means for processing said signals, including means for comparing said signals to a threshold level to determine if said sun image is Superimposed on one of said two detectors, said signal processing means ignoring a signal from a detector on which said sun image is superimposed.

8. The system of claim 7 wherein said detectors are IR detectors.

9. The system of claim 7 wherein each of said first and said second group includes two detectors disposed at said selected distance.

10. The system of claim 7 further comprising projecting means for projecting said images on said array.

11. The system of claim 10 wherein said projecting means includes shutter means for selectively blocking said image from said array.

12. The system of claim 11 further comprising comparing means for comparing signals from said detectors when said array is blocked and unblocked.

13. The system of claim 11 wherein said shutter means is controlled by microprocessor.

14. The system of claim 7 wherein said signal processing means includes a microprocessor.

* * * * *